Oct. 12, 1926. 1,603,172
E. A. WATTS
MEANS TO LUBRICATE GAS ENGINES
Filed Oct. 20, 1924
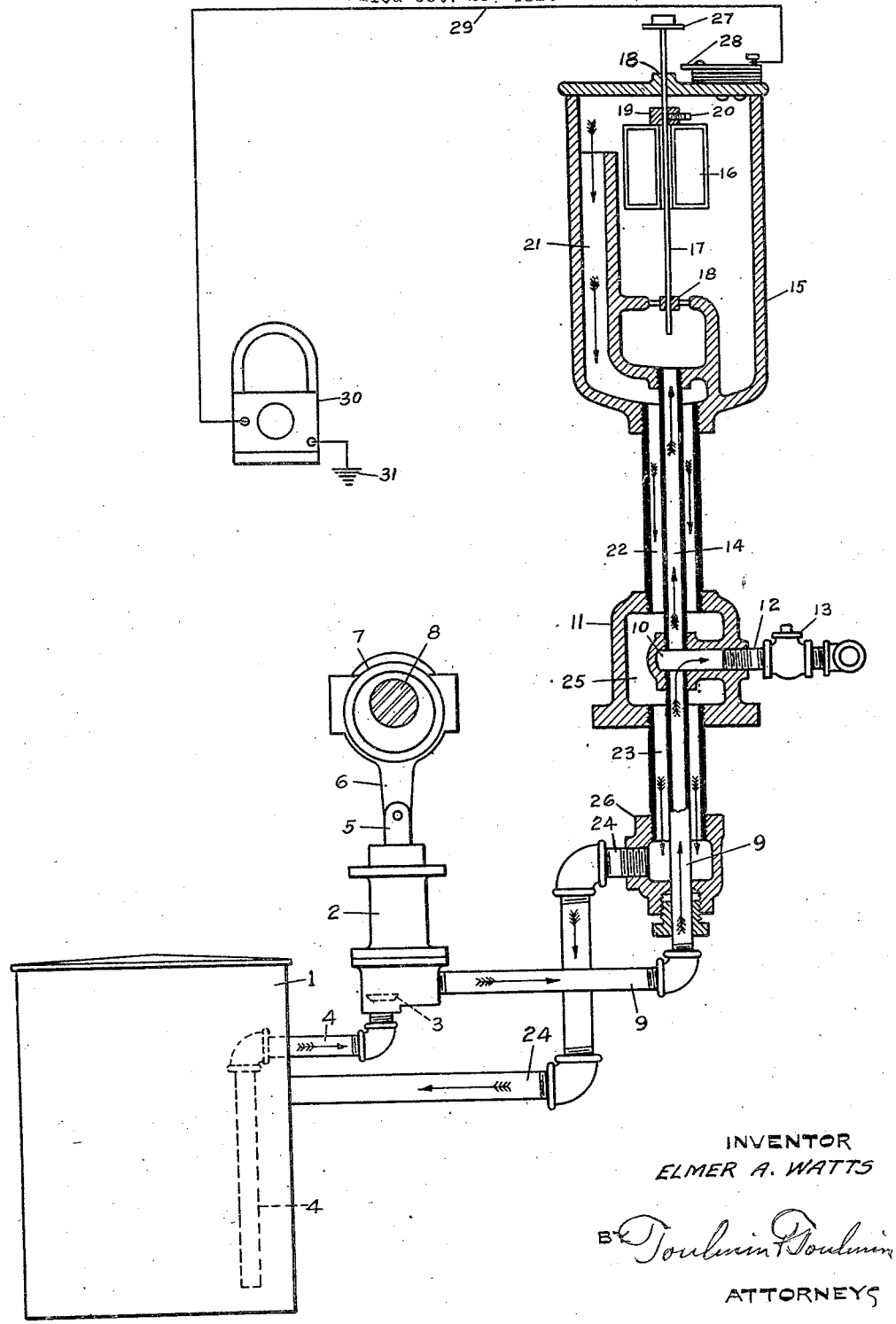
INVENTOR
ELMER A. WATTS
BY Toulmin Toulmin
ATTORNEYS Patented Oct. 12, 1926.

1,603,172

UNITED STATES PATENT OFFICE.

ELMER A. WATTS, OF SPRINGFIELD, OHIO, ASSIGNOR TO THE MILLER IMPROVED GAS ENGINE COMPANY, OF SPRINGFIELD, OHIO, A CORPORATION OF OHIO.

MEANS TO LUBRICATE GAS ENGINES.

Application filed October 20, 1924. Serial No. 744,690.

This invention relates to improvements in means to lubricate engines, more particularly gas or explosive engines.

My invention is directed to two essential objects:

First, to provide means for automatically grounding the magneto circuit so as to deprive the engine of its spark current, and thus to stop it, whenever the lubricant oil ceases, from any cause, to feed to the engine parts.

Second, to provide means to return to the source of supply, the oil filter or tank, that portion of the oil drawn therefrom which is in excess of the quantity used in lubricating the engine, so that such surplus will automatically return into the filter or tank and only so much oil as the engine needs for its lubrication will pass to it.

In the accompanying drawings, the figure is a partial side elevation and partial vertical sectional view of my improved lubricator.

The numeral 1 designates a lubricant oil container in the nature of a tank which may, if desired, contain means within it for filtering the oil. The peculiarities, however, of this container do not form any part of the present invention, which requires merely that there shall be a suitable container or tank adapted to contain lubricant oil. The numeral 2 designates an oil pump of the cylinder and piston variety with the necessary conventional check valve to admit the inflow and permit the discharge of oil into and from the cylinder without returning to the supply. Such a valve is indicated in dotted lines at 3. The cylinder is connected by a supply pipe 4 with the tank 1 and the piston 5 is operated by an eccentric arm 6 mounted on an eccentric 7 carried by a shaft 8 which may be rotated in any convenient manner by a suitable connection with the driving shaft of an engine, say a gas or explosive engine.

This pump draws lubricant from the tank and forces it through a pipe line 9 into a passage 10 in a casing 11. A continuation of the pipe line indicated at 12 takes the oil from the passage 10 on to the engine whence it is distributed to the different parts that are to be lubricated by such means as the particular engine may be equipped with. Engines vary in this particular. A cut-off valve 13 is adapted to be turned to permit the oil to flow in full or less than full quantity or to be shut off should occasion require.

Thus it will be seen that means are provided for the ready and efficient delivery of the lubricant from the tank to the engine. But as in practice the quantity of oil consumed by the lubrication will vary according to the nature and number of engine parts and according to the size and character of different engines, there must be supplied a sufficient or maximum quantity to meet maximum requirements. To safeguard this requirement, the supply drawn from the tank must be in excess of possible maximum requirements, and this excess will vary with the amounts used for lubrication because while the latter are inconstant, the quantity of oil drawn from the tank is substantially constant. This surplus must be returned to the tank. And this surplus must also, in accordance with my invention, be utilized as a factor in causing the magneto circuit to be grounded. To these ends my invention includes the following instrumentalities: a surplus pipe line 14 carried by the casing 11 and having communication with the channel 10 so that the surplus oil will pass through this line 14 into a float chamber 15, in which is placed a float 16 mounted on a stem 17 having slidable bearings 18 in the chamber. A convenient means of securing the float to the stem is by a collar 19 carried by the float and a set screw 20 adapted to impinge the stem. The surplus oil gathers, it will now be seen, in this float chamber and under normal conditions will overflow into the passage 21 and thence into the return pipe line composed of sections 22, 23 and 24 and leading into the tank 1. The section 22 connects the float chamber 15 with the casing 11 and discharges its oil into the interior 25 of the casing whence it flows into section 23 into a coupling 26 and thence into section 24. The section 23 connects the casing 11 and the coupling 26 together.

It will now be seen that the surplus oil branches off in the passage 10 from the quantity being consumed and will accumulate in the float chamber 15 and overflow therefrom as it continues to accumulate, and will return thence to the tank 1.

When conditions are normal the float will be floated by the accumulated oil in the float chamber but whenever something abnormal occurs, as a failure on the part of the pump to properly function, or a leakage in the pipe line to the engine, or other cause which may deprive the engine of the required quantity of lubricant, and which will therefore also prevent the accumulation of a surplus in the float chamber, the float will settle down and bring the contact point 27 carried by the stem into electrical connection with the contact 28 which is carried by, but insulated from the float chamber. A circuit wire 29 extends from the contact 28 to the usual magneto 30 connected with a ground line 31. Hence when the surplus oil fails to reach the float chamber and sustain the float, this circuit is closed and the magneto is grounded with the result that the engine is automatically stopped and prevented from running without sufficient or any lubricant, as the case may be.

It will now be seen that I have provided means for automatically stopping the engine whenever there is a failure of lubrication, and that I utilize the supply of the lubricant itself to cause the magneto to be grounded and the engine to be deprived of the sparking current.

And it will be seen also that I carry into effect that other object of my invention, that of returning the surplus oil to the tank.

I desire to comprehend within my invention such modifications as may be necessary to adapt it to varying conditions.

Having thus fully described my invention, what I claim as new and desire to secure by Letters Patent of the United States, is:

1. In a lubricating apparatus, the combination with an oil tank of a pump connected therewith, a pipe line from the pump to an engine, a surplus oil line branching from the engine line, a float chamber connected with said surplus line, a float in the chamber, a stem therefor having a contact point, a magneto circuit adapted to be opened and closed by said point, an overflow passage within the float chamber, a return pipe line connected therewith and running thence to the supply tank, such return line enclosing a part of the engine line and enclosing the surplus line.

2. In a lubricating apparatus, the combination with an oil supply tank of a pump connected thereto, a casing having an interior channel, a pipe line from the pump to said channel, an engine line from the channel to an engine, a surplus line communicating with the channel, a float chamber to which the surplus line connects and adapted to receive oil therefrom, a float within the chamber and having a stem with a contact point, a magneto line adapted to be closed by said contact point when lubricant within the chamber is below a general normal, an overflow return passage within the chamber, a return line section connected with the chamber and said casing, another return line section connected to the casing, a coupling attached to such section and a return line section connecting the coupling with the supply tank.

3. In a lubricating apparatus, the combination with a float chamber, a float therein having a contact point, a return oil passage in said chamber, a casing having an oil channel, a surplus oil pipe connecting said channel with the float chamber, a return oil pipe connecting said chamber with said casing, a pump, an oil pipe line connecting said channel with said pump, a coupling, a return pipe connecting said coupling to said casing, and a further return pipe extending from said coupling.

In testimony whereof, I affix my signature.

ELMER A. WATTS.